US012762033B2

(12) United States Patent
Akarapu et al.

(10) Patent No.: US 12,762,033 B2
(45) **Date of Patent: *Oct. 13, 2026**

(54) DYNAMICALLY PROVIDING REAL-TIME CONFIGURATION OF DATA RESEARCH CONTROL LIMITS

(71) Applicant: Bank of America Corporation, Charlotte, NC (US)

(72) Inventors: Om Purushotham Akarapu, Hyderabad (IN); Kaushik Kumar Akula, Hyderabad (IN); Bibhudatta Jena, Hyderabad (IN); Nunna Venkata Sri Satya Mounika, Hyderabad (IN); Ragala Manoj Sivaram, Hyderabad (IN); Rajashekar Gangaram Basarveni, Mumbai (IN); Rudraraju Ramakrishnamraju, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,929

(22) Filed: Feb. 3, 2025

(65) Prior Publication Data

US 2025/0181472 A1 Jun. 5, 2025

Related U.S. Application Data

(63) Continuation of application No. 17/670,970, filed on Feb. 14, 2022, now Pat. No. 12,277,048.

(51) Int. Cl.

| | |
|---|---|
| ***G06F 7/00*** | (2006.01) |
| ***G06F 11/34*** | (2006.01) |
| ***G06F 16/2458*** | (2019.01) |

(52) U.S. Cl.
CPC .......... *G06F 11/34* (2013.01); *G06F 16/2468* (2019.01)

(58) Field of Classification Search
CPC ............... G06F 16/2468; G06F 16/313; G06F 16/3334; G06F 16/219; G06F 16/248;
(Continued)

(56) References Cited

U.S. PATENT DOCUMENTS

| | | |
|---|---|---|
| 5,461,699 A | 10/1995 | Arbabi et al. |
| 6,597,777 B1 | 7/2003 | Ho |

(Continued)

FOREIGN PATENT DOCUMENTS

| | | |
|---|---|---|
| WO | 200506449 A1 | 1/2005 |

OTHER PUBLICATIONS

May 2, 20243—(US) Office Action—U.S. Appl. No. 17/670,970.
Dec. 18, 2024—(US) Notice of Allowance—U.S. Appl. No. 17/670,970.

*Primary Examiner* — Mohammad A Sana
(74) *Attorney, Agent, or Firm* — Banner & Witcoff, Ltd.

(57) ABSTRACT

Aspects of the disclosure relate to computing hardware and software for dynamic control limit configuration. A computing platform may receive and format historical data. The computing platform may input the formatted data into a control limit prediction model, which may output predicted control limits by weighting, using an ensemble model, outputs from a plurality of other models to produce predicted control limits. The computing platform may adjust existing control limits based on predicted control limits to create actual control limits. The computing platform may receive real time data, and may identify, using the actual control limits and the real time data, a deviation score for the real time data. The computing platform may compare the deviation score to the actual control limits. Based on detecting that the deviation score breaches the actual control
(Continued)

limits, the computing platform may send an indication of the breach.

20 Claims, 8 Drawing Sheets

(58) Field of Classification Search
CPC .... G06F 11/34; G06F 11/1415; G06F 11/004; G06F 11/0751; G06Q 40/00; G06Q 40/02
See application file for complete search history.

(56) References Cited

U.S. PATENT DOCUMENTS

| | | | | |
|---|---|---|---|---|
| 7,505,868 | B1 | 3/2009 | Shan | |
| 8,751,436 | B2 * | 6/2014 | Lowry | G06Q 40/00 706/52 |
| 10,110,625 | B2 | 10/2018 | Kern et al. | |
| 11,593,100 | B2 * | 2/2023 | Mathew | H04L 67/34 |
| 12,277,048 | B2 * | 4/2025 | Akarapu | G06F 11/34 |
| 2007/0001637 | A1 | 1/2007 | Murphy et al. | |
| 2009/0313632 | A1 | 12/2009 | Haenel et al. | |
| 2010/0077073 | A1 | 3/2010 | Haenel et al. | |
| 2010/0152544 | A1 | 6/2010 | Weaver et al. | |
| 2013/0054077 | A1 | 2/2013 | Waltz et al. | |
| 2013/0061260 | A1 | 3/2013 | Maskatia et al. | |
| 2013/0325674 | A1 * | 12/2013 | Yeri | G06Q 40/02 705/30 |
| 2014/0195076 | A1 | 7/2014 | Waltz et al. | |
| 2015/0268282 | A1 | 9/2015 | Ahmadi et al. | |
| 2016/0269778 | A1 | 9/2016 | Maskatia et al. | |
| 2017/0202592 | A1 | 7/2017 | Shelton, IV et al. | |
| 2017/0202594 | A1 | 7/2017 | Shelton, IV et al. | |
| 2019/0033824 | A1 | 1/2019 | Yontay et al. | |
| 2019/0050748 | A1 * | 2/2019 | Cmielowski | G06Q 10/067 |
| 2020/0138473 | A1 | 5/2020 | Shelton, IV et al. | |
| 2024/0111319 | A1 * | 4/2024 | Wang | G05B 13/048 |

* cited by examiner

DYNAMICALLY PROVIDING REAL-TIME CONFIGURATION OF DATA RESEARCH CONTROL LIMITS

CROSS REFERENCE TO RELATED APPLICATION

This application claims priority to and is a Continuation of U.S. Ser. No. 17/670,970, filed on Feb. 14, 2022, and titled "Dynamically Providing Real-Time Configuration of Data Research Control Limits." The related application is incorporated by reference herein in its entirety for all purposes.

BACKGROUND

Aspects of the disclosure relate to computing hardware and software, particularly distributed computing hardware and software for machine learning analysis. In some instances, software or other products may produce output data, which may be indicative of an acceptable state or event, or alternatively, may be indicative of an unacceptable state or event. Although limits defining acceptable ranges of output data may be arbitrarily set, such ranges may become stale or otherwise inaccurate markers for acceptable data. Accordingly, this may result in detection of false positives and/or false negatives in data analysis. As such products are more heavily relied on, ensuring the accuracy of data control limits for such products may become increasingly important.

SUMMARY

Aspects of the disclosure provide effective, efficient, scalable, and convenient technical solutions that address and overcome the technical problems associated with developing and implementing computer hardware and software that dynamically configures data control limits. In accordance with one or more embodiments of the disclosure, a computing platform comprising at least one processor, a communication interface, and memory storing computer-readable instructions may receive historical data. The computing platform may format the historical data for input into a control limit prediction model. The computing platform may input the formatted data into the control limit prediction model. The computing platform may output, using two or more sub-models of the control limit prediction model, model specific predicted control limits. The computing platform may weight, using an ensemble model of the control limit prediction model, the outputs from the two or more sub-models to produce overall predicted control limits based on analysis performed by each of the two or more sub-models. The computing platform may adjust existing control limits based on overall predicted control limits to create actual control limits. The computing platform may receive real time data. The computing platform may identify, using an upper control limit of the actual control limits, a lower control limit of the actual control limits, and the real time data, a deviation score for the real time data. The computing platform may compare the deviation score to the actual control limits. Based on detecting that the deviation score breaches the actual control limits, the computing platform may send one or more commands directing an enterprise user device to display an indication of the breach, which may cause the enterprise user device to display the indication of the breach.

In one or more instances, the historical data may be raw transaction data for a financial product, and might not be configured for processing by the control limit prediction model. In one or more instances, formatting the historical data for input into the control limit prediction model may include one or more of: 1) repairing missing values in the historical data, 2) transforming categorical data of the historical data into numerical values, and 3) scaling the historical data to a common scale.

In one or more examples, the plurality of other models may include two or more of: an exponential smoothing model, a seasonal autoregressive integrated moving average model, a random forest model, a stochastic gradient descent model, a boosting model, and a human in the loop component. In one or more examples, the ensemble model may be a stack lasso model.

In one or more instances, identifying the deviation score for the real time data may include applying the following formula: deviation score=((2*[value])−([lower control limit]+[upper control limit]))/([upper control limit]−[lower control limit]), where the value may be the real time data, the lower control limit may be a lower bound of the actual control limits, and the upper control limit may be an upper bound of the actual control limits. In one or more instances, the computing platform may receive, from the enterprise user device, a feedback message including user feedback indicating one or more of: 1) the identified breach is acceptable, 2) the identified breach is more severe than indicated in the indication of the breach, and 3) the identified breach is an outlier data point. The computing platform may update, based on the user feedback and through a human in the loop component of the control limit prediction model, the control limit prediction model.

In one or more examples, the computing platform may update the control limit prediction model by, based on identifying, based on the user feedback, that the identified breach is acceptable, increasing an acceptable range supported by the actual control limits. In one or more examples, the computing platform may update the control limit prediction model by, based on identifying, based on the user feedback, that the identified breach is more severe than indicated in the indication of the breach, decreasing an acceptable range supported by the actual control limits. In one or more examples, the computing platform may update the control limit prediction model by, based on identifying, based on the user feedback, that the identified breach is the outlier data point, flagging the identified breach as an outlier within the control limit prediction model without adjusting the actual control limits.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to dynamic configuration of data control limits. In some instances, financial information products may help an organization with risk mitigation, regulatory compliance, market research, and/or revenue generation.

Control limit configuration for research metrics may be critical to the quality of financial information products. Due to the volatile nature of the financial data from multiple data sources, manual, or general automation of setting the control limits for research metrics might not be feasible.

An upper control limit and a lower control limit for the metric may be determined based on the transaction information. Thereafter, the latest actual value of the metric may be computed.

In some instances, real time dynamic configuration of control limits may be needed to ensure that the quality of data research is optimal. Accordingly, described herein is a technical solution that creates real time dynamic configuration of control limits to ensure that the quality of data research is optimal.

This may include engineered features, an artificial intelligence ensemble, an alert mechanism, and/or system monitoring. In some instances, SQL, python, natural language processing (NLP), and/or machine learning (ML) may be used.

In doing so, financial information products with high quality data may be deployed for risk mitigation, regulatory compliance, and/or revenue generation. As described herein, real time dynamic configuration of control limits for research metrics of financial information products may be based on human-in-the-loop feedback. This apparatus may be embedded into any financial information products.

These and other features are described in further detail below.

Figure 1A:
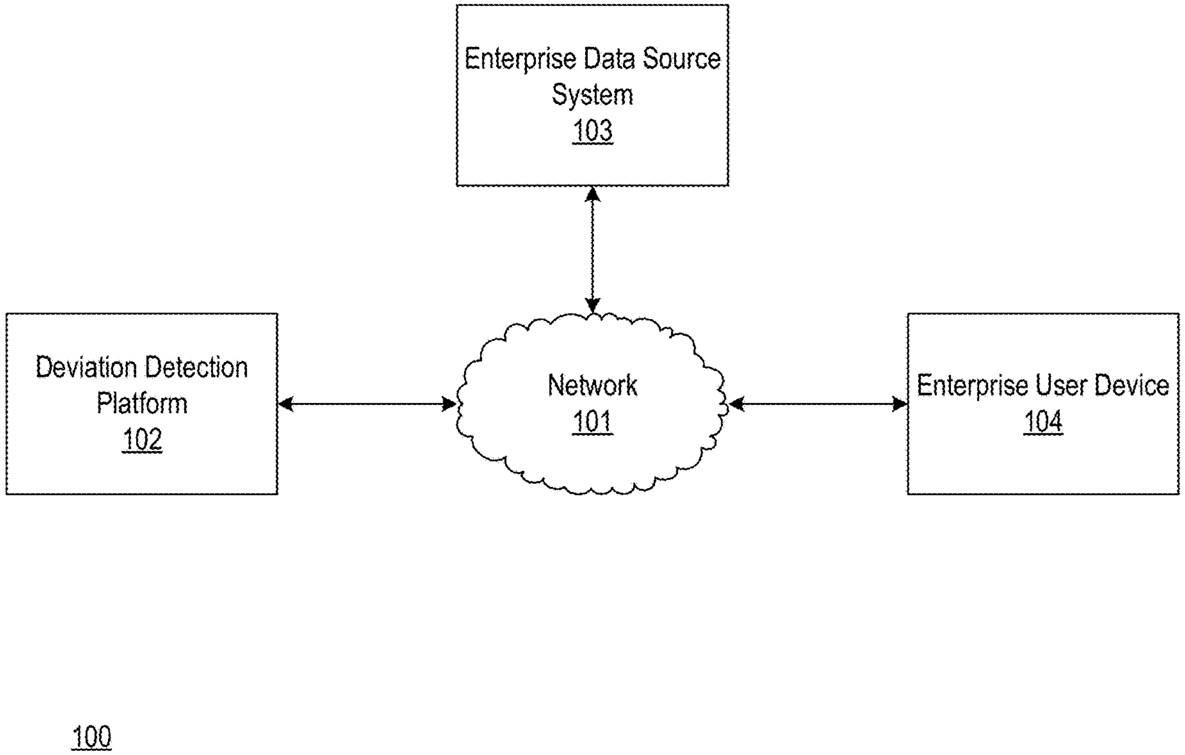
FIGS. 1A-1B depict an illustrative computing environment configured to perform dynamic configuration of data control limits in accordance with one or more example embodiments.
Figure 1B:
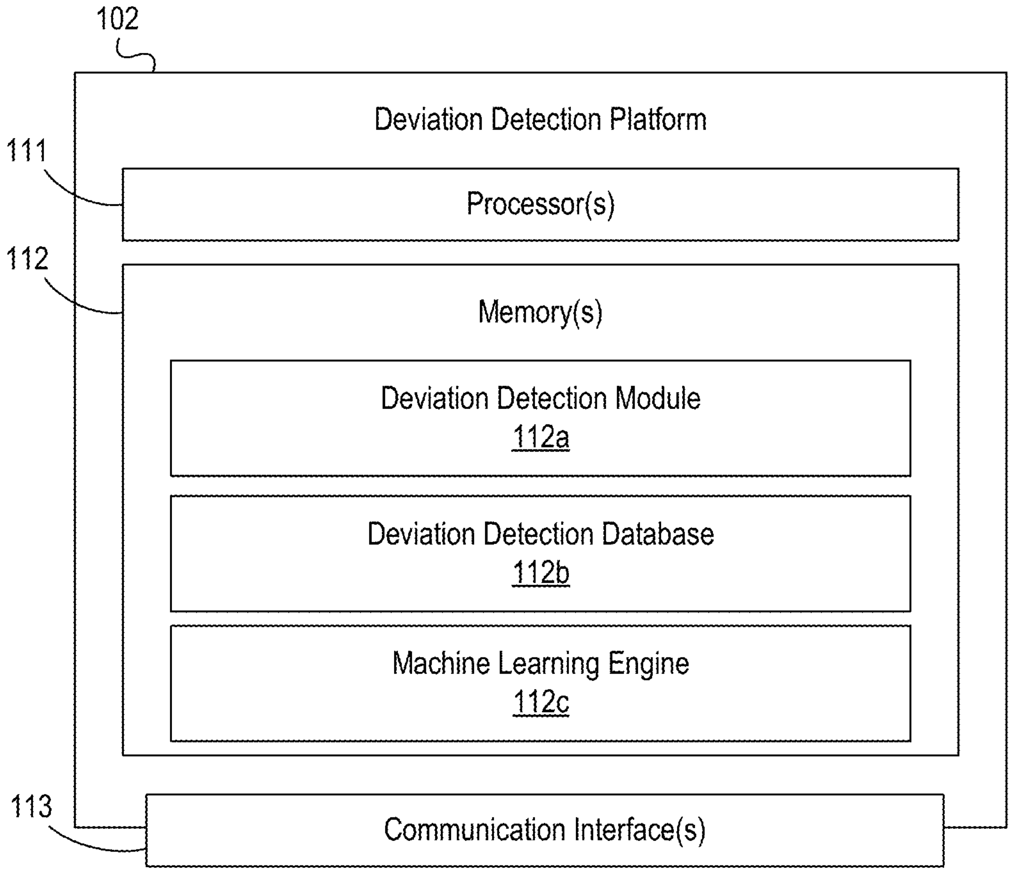

FIGS. 1A-1B depict an illustrative computing environment that provides dynamic configuration of data control limits in accordance with one or more example embodiments. Referring to FIG. 1A, computing environment 100 may include one or more computer systems. For example, computing environment 100 may include deviation detection platform 102, enterprise data source system 103, and enterprise user device 104.

As described further below, deviation detection platform 102 may be a computer system that includes one or more computing devices (e.g., servers, server blades, or the like) and/or other computer components (e.g., processors, memories, communication interfaces) that may be used to dynamically configure data control limits as described further below. In these instances, the deviation detection platform 102 may be configured to train, host, and/or otherwise maintain one or more machine learning models that may be used to identify data control limits for various products (e.g., financial products or other products). The deviation detection platform 102 may further analyze data in real time, using the data control limits, to detect errors and/or other data issues.

Enterprise data source system 103 may be and/or otherwise include one or more computing devices (e.g., servers, server blades, and/or other devices) and/or other computer components (e.g., processors, memories, communication interfaces) that may be used for control limit configuration. For example, enterprise data source system 103 may be configured to store product data (e.g., raw data corresponding to financial products, such as raw transaction data). In some instances, the enterprise data source system 103 may be configured to communicate with the deviation detection platform 102 to provide historical data (which may be used to train the deviation detection platform 102) and/or real time data (which may be analyzed by the deviation detection platform 102).

Enterprise user device 104 may be and/or otherwise include one or more devices such as a laptop computer, desktop computer, mobile device, tablet, smartphone, and/or other devices that may be used by an individual (e.g., an enterprise employee) to monitor or otherwise manage products (e.g., financial products, or other products). In some instances, enterprise user device 104 may be configured to display one or more user interfaces (e.g., control limit breach indications, or the like). Although a single enterprise user device 104 is shown, any number of such devices may be deployed in the systems/methods described below without departing from the scope of the disclosure.

Computing environment 100 also may include one or more networks, which may interconnect deviation detection platform 102, enterprise data source system 103, and/or enterprise user device 104. For example, computing environment 100 may include a network 101 (which may interconnect, e.g., deviation detection platform 102, enterprise data source system 103, and/or enterprise user device 104).

In one or more arrangements, deviation detection platform 102, enterprise data source system 103, and/or enterprise user device 104 may be any type of computing device capable of sending and/or receiving requests and processing the requests accordingly. For example, deviation detection platform 102, enterprise data source system 103, enterprise user device 104, and/or the other systems included in computing environment 100 may, in some instances, be and/or include server computers, desktop computers, laptop computers, tablet computers, smart phones, cameras, microphones, and/or other devices that may include one or more processors, memories, communication interfaces, storage devices, and/or other components. As noted above, and as illustrated in greater detail below, any and/or all of deviation detection platform 102, enterprise data source system 103, and/or enterprise user device 104, in some instances, be special-purpose computing devices configured to perform specific functions.

Referring to FIG. 1B, deviation detection platform 102 may include one or more processors 111, memory 112, and communication interface 113. A data bus may interconnect processor 111, memory 112, and communication interface 113. Communication interface 113 may be a network interface configured to support communication between deviation detection platform 102 and one or more networks (e.g., network 101, or the like). Memory 112 may include one or more program modules having instructions that when executed by processor 111 cause deviation detection platform 102 to perform one or more functions described herein and/or one or more databases that may store and/or otherwise maintain information which may be used by such program modules and/or processor 111. In some instances, the one or more program modules and/or databases may be stored by and/or maintained in different memory units of deviation detection platform 102 and/or by different computing devices that may form and/or otherwise make up deviation detection platform 102. For example, memory 112 may have, host, store, and/or include deviation detection module 112*a*, deviation detection database 112*b*, and/or machine learning engine 112*c*.

Deviation detection module 112*a* may have instructions that direct and/or cause deviation detection platform 102 to provide dynamic configuration of data control limits, as discussed in greater detail below. Deviation detection database 112*b* may store information used by deviation detection module 112*a* and/or deviation detection platform 102 in application of advanced techniques to provide improved configuration of data control limits, and/or in performing other functions. Machine learning engine 112*c* may be used by the deviation detection module 112*a* and/or the deviation detection platform 102 to train, maintain, and/or otherwise refine a model, such as a control limit prediction model, that may perform dynamic configuration of data control limits. For example, the machine learning engine may use the control limit prediction model to output predicted control limits, which may, e.g., be used to adjust actual control limits and identify data deviations the fall outside of the corresponding control limit range accordingly.

Figure 2A:
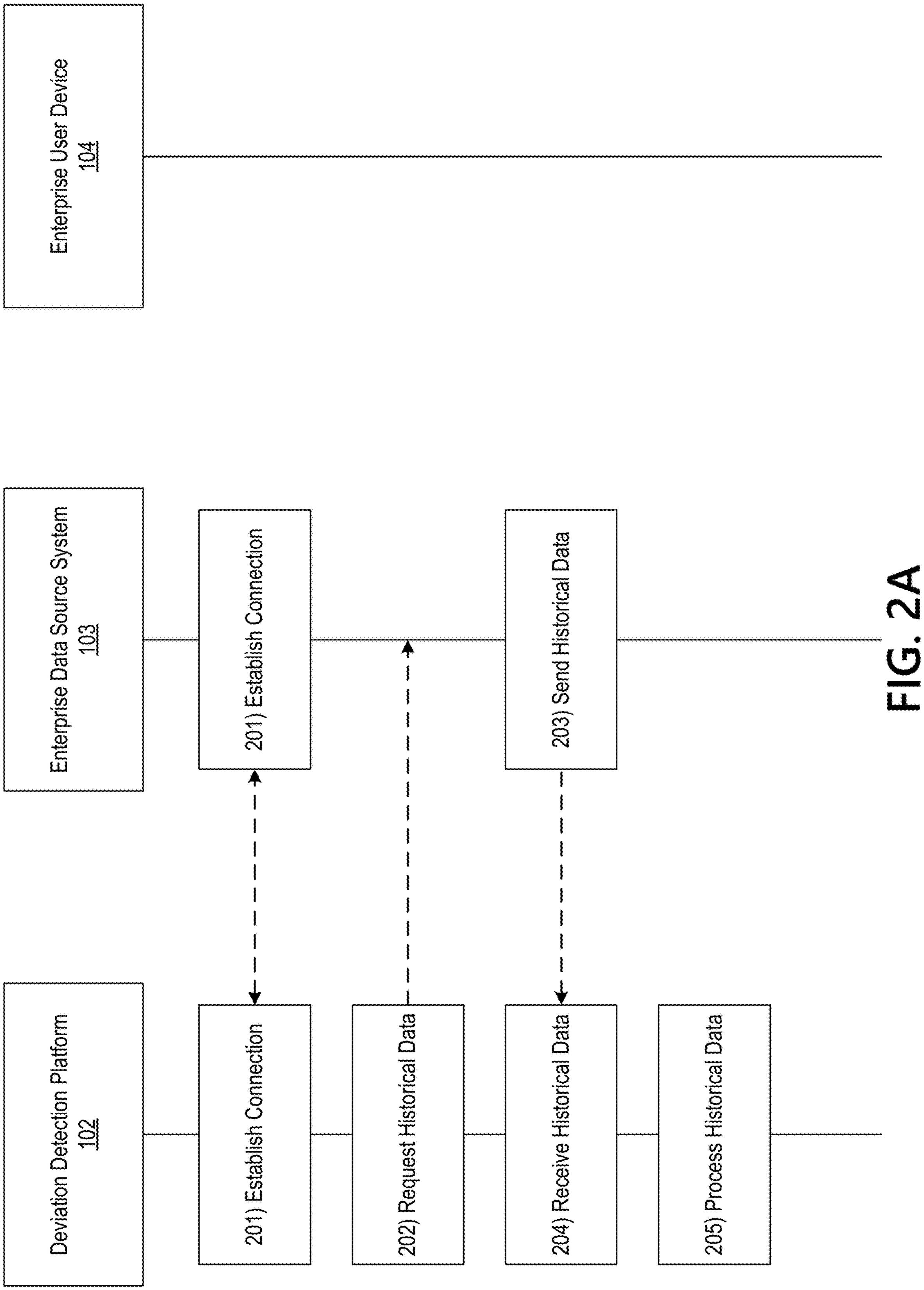
FIGS. 2A-2D depict an illustrative event sequence for performing dynamic configuration of data control limits in accordance with one or more example embodiments.

FIGS. 2A-2D depict an illustrative event sequence for dynamic configuration of data control limits in accordance with one or more example embodiments. Referring to FIG. 2A, at step 201, the deviation detection platform 102 may establish a connection with the enterprise data source system 103. For example, the deviation detection platform 102 may establish a first wireless data connection with the enterprise data source system 103 to link the deviation detection platform 102 to the enterprise data source system 103 (e.g., in preparation for requesting historical data). In some instances, the deviation detection platform 102 may identify whether or not a connection is already established with the enterprise data source system 103. If a connection is already established with the enterprise data source system 103, the deviation detection platform 102 might not re-establish the connection. If a connection is not yet established with the enterprise data source system 103, the deviation detection platform 102 may establish the first wireless data connection as described herein.

At step 202, the deviation detection platform 102 may request historical data from the enterprise data source system 103. For example, the deviation detection platform 102 may request raw data (e.g., transaction data, and/or other data) corresponding to one or more products (e.g., financial products and/or other products). In some instances, the deviation detection platform 102 may request the historical data via the communication interface 113 and while the first wireless data connection is established.

At step 203, the enterprise data source system 103 may send historical data to the deviation detection platform 102. For example, the enterprise data source system 103 may send the historical data to the deviation detection platform 102 while the first wireless data connection is established.

At step 204, the deviation detection platform 102 may receive the historical data sent at step 203. In some instances, in receiving the historical data, the deviation detection platform 102 may receive data that might not be configured for analysis by a control limit prediction model (which is described further below). For example, the deviation detection platform 102 may receive data (from one or more data sources) that includes missing values, categorical data, non-standardized data, and/or other unprocessed data. For example, the deviation detection platform 102 may receive the historical data via the communication interface 113 and while the first wireless data connection is established. Although steps 201-204 illustrate receiving historical data from a single data source, historical data may be requested and/or received from any number of sources without departing from the scope of the disclosure.

At step 205, the deviation detection platform 102 may process the historical data received at step 204. For example, the deviation detection platform 102 may repair missing values in the historical data, transform categorical data of the historical data into numerical values, scale the historical data to a common scale, and/or otherwise format the historical data for input into and analysis by the control limit prediction model.

Figure 2B:
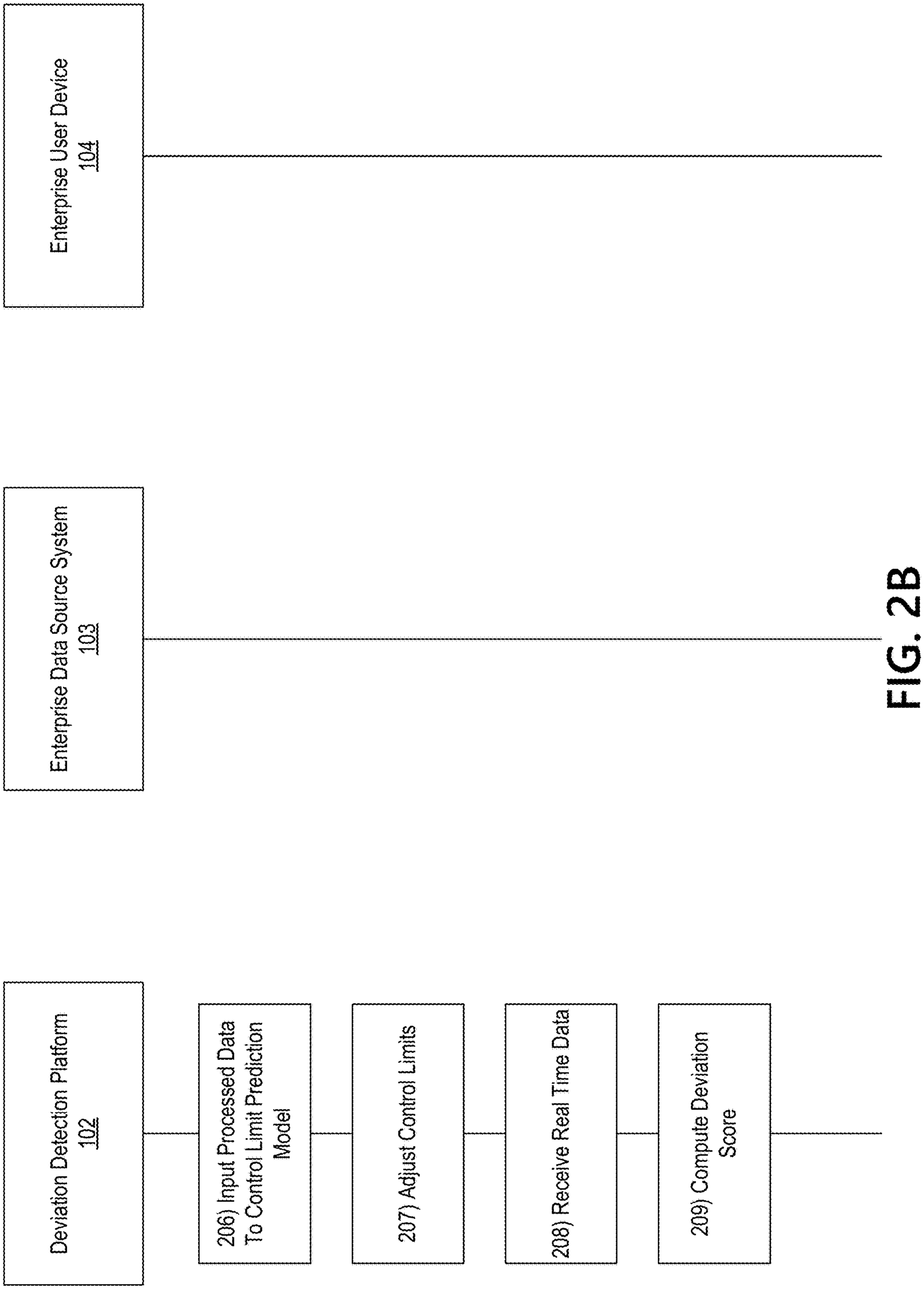

Referring to FIG. 2B, at step 206, the deviation detection platform 102 may input the processed data into the control limit prediction model. In some instances, the control limit prediction model may include one or more sub-models, and the deviation detection platform 102 may input the processed data into each of the one or more sub-models accordingly. For example, the control limit prediction model may include an exponential smoothing model, a seasonal autoregressive integrated moving average model, a random forest model, a stochastic gradient descent model, a boosting model, and/or other models. In some instances, the control limit prediction model may be further configured with a human in the loop component, which may, e.g., be configured to update or otherwise refine the control limit prediction model based on user feedback. The deviation detection platform 102 may use each of the one or more sub-models to produce a respective output. In doing so, the deviation detection platform 102 may gain the benefits of analysis by each of the one or more sub-models, rather than merely a single model. Once the one or more sub-models have produced outputs, the deviation detection platform 102 may use an ensemble model (e.g., a stack lasso, or other ensemble model) to weight the outputs of the one or more sub-models (e.g., based on a type of product corresponding to the historical data, a temporal component (a day, a time, a month, a season, or the like), previous analysis patterns, and/or otherwise). In some instances, in weighting the outputs of the one or more sub-models, the deviation detection platform 102 may give full weight to one of the one or more sub-models and/or zero out one of the one or more sub-models. In some instances, the deviation detection platform 102 may use the human in the loop component to inform the ensemble model (e.g., based on user feedback received). In some instances, based on the weights assigned to each of the one or more sub-models, the deviation detection platform 102 may determine a weighted average of the outputs of the one or more sub-models, which may define a predicted upper control limit and/or a predicted lower control limit. For example, the predicted upper control limit and the predicted lower control limit may define upper and lower bounds for data corresponding to the product with which the historical data is associated (e.g., defining an acceptable range for such data).

At step 207, the deviation detection platform 102 may adjust any existing data control limits, based on the predicted control limits output at step 206, to update the actual control limits. In doing so, the deviation detection platform 102 may perform a real time, dynamic control limit adjustment. In other instances, existing data control limits might not have been previously established for the product, and thus the predicted data control limits may be used to set the actual control limits. In some instances, the deviation detection platform 102 may store the actual control limits accordingly. For example, the deviation detection platform 102 may store the actual control limits in a metric profile, corresponding to the product associated with the historical data. For example, historical data may be received for any number of products, and actual control limits may be set for each product accordingly and stored in a corresponding metric profile for subsequent analysis of each given product. Accordingly, the deviation detection platform 102 may establish limits that may be used to identify an acceptable data range, and breaches of these limits may be identified accordingly.

At step 208, the deviation detection platform 102 may receive real time data for the product corresponding to the historical data. For example, the deviation detection platform 102 may receive real time data that may be analyzed using the actual control limits established at step 207. In some instances, the deviation detection platform 102 may receive the real time data by monitoring a repository for research metrics and/or data, which may e.g., be stored at or otherwise hosted by the enterprise data source system 103.

At step 209, the deviation detection platform 102 may determine a deviation score for the real time data based on the actual control limits. For example, the deviation detection platform 102 may apply the following formula: deviation score=((2*[value])−([lower control limit]+[upper control limit]))/([upper control limit]−[lower control limit]), where the value is the real time data, the lower control limit is a lower bound of the actual control limits, and the upper control limit is an upper bound of the actual control limits. In doing so, the deviation detection platform 102 may determine a score indicative of the real time data's deviation from its anticipated value (or range of values thereof).

Figure 2C:
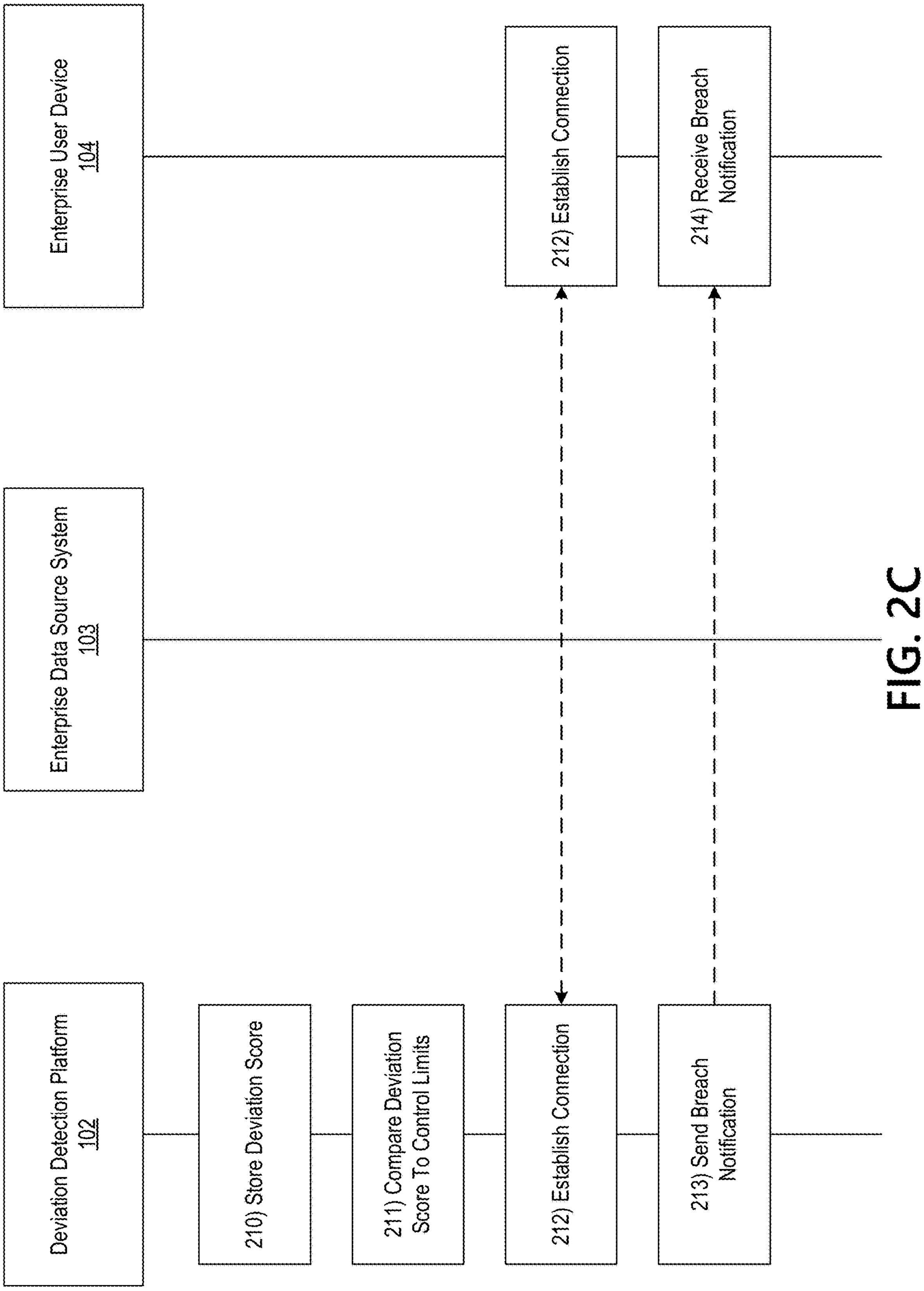

Referring to FIG. 2C, at step 210, the deviation detection platform 102 may store the deviation score. For example, the deviation detection platform 102 may store the deviation score along with the metric profile and/or in the research metric repository.

At step 211, the deviation detection platform may compare the deviation score to the actual control limits. In some instances, the deviation detection platform 102 may identify that the deviation score is equal to or otherwise within the actual control limits. In these instances, the deviation detection platform 102 might not take further action with regard to the deviation score (although the deviation detection platform 102 may, in these instances, feed the real time data into the control limit prediction model to further refine or otherwise update/reinforce the model). In other instances, the deviation detection platform 102 may identify that the deviation score is outside of the actual control limits. In these instances, the deviation detection platform 102 may proceed to step 212.

At step 212, the deviation detection platform 102 may establish a connection with the enterprise user device 104. For example, the deviation detection platform 102 may establish a second wireless data connection with the enterprise user device 104 to link the deviation detection platform 102 to the enterprise user device 104 (e.g., in preparation for sending a breach notification). In some instances, the deviation detection platform 102 may identify whether or not a connection is already established with the enterprise user device 104. If a connection is already established with the enterprise user device 104, the deviation detection platform 102 might not re-establish the connection. Otherwise, if a connection is not yet established with the enterprise user device 104, the deviation detection platform 102 may establish the second wireless data connection as described herein.

At step 213, the deviation detection platform 102 may generate a message indicating the breach identified at step 311, and may send the message to the enterprise user device 104. For example, the deviation detection platform 102 may send a message to a user device of an owner, analyst, operator, manager, and/or other individual corresponding to the product associated with the real time data. In some instances, the deviation detection platform 102 may also send one or more commands directing the enterprise user device 104 to display the message indicating the breach. In some instances, the deviation detection platform 102 may send the breach message via the communication interface 113 and while the second wireless data connection is established.

At step 214, the enterprise user device 104 may receive the breach message sent at step 213. In some instances, the enterprise user device 104 may also receive the one or more commands directing the enterprise user device 104 to display the breach message. In some instances, the enterprise user device 104 may receive the breach message while the second wireless data connection is established.

Figure 2D:
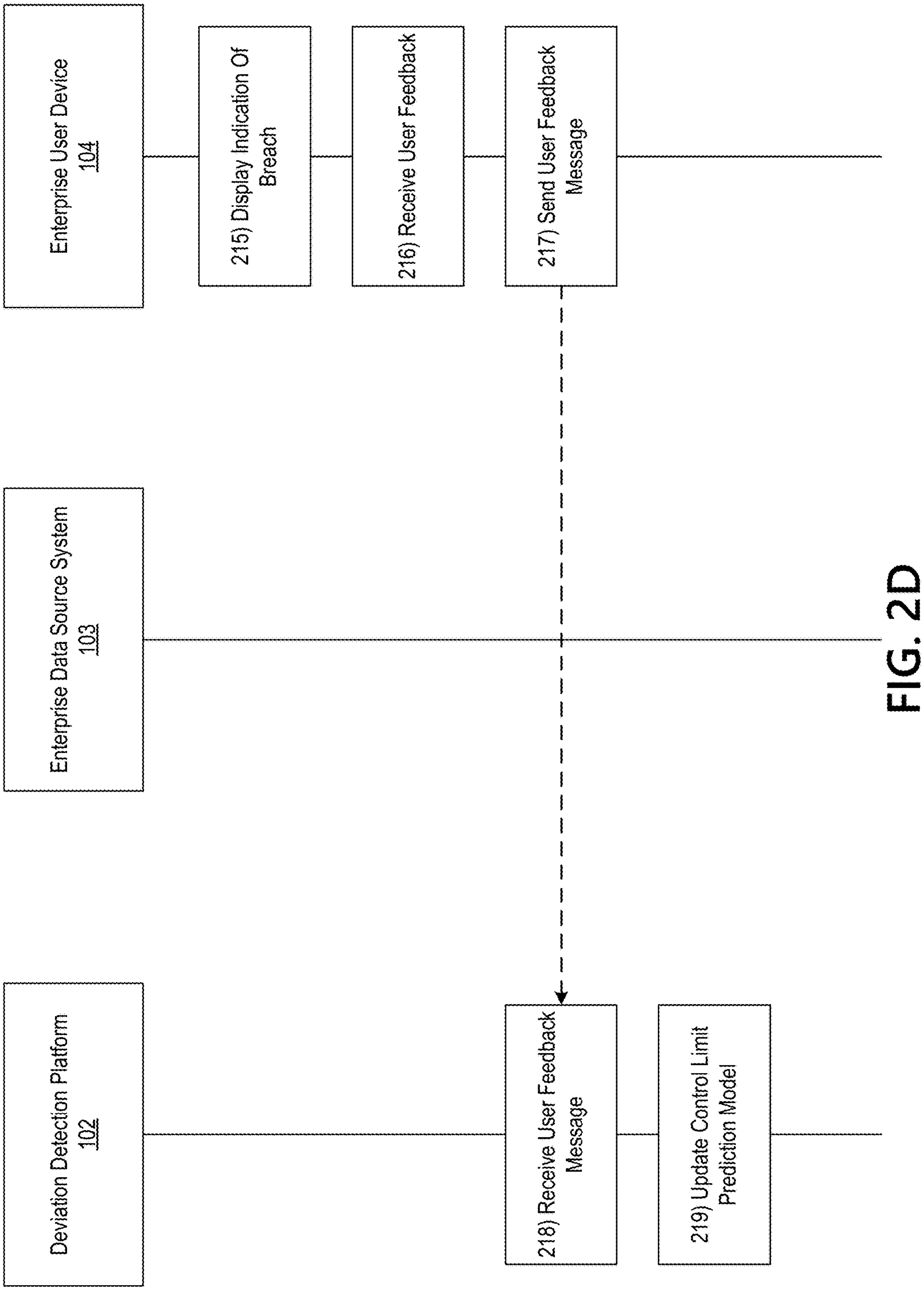
Figure 4:
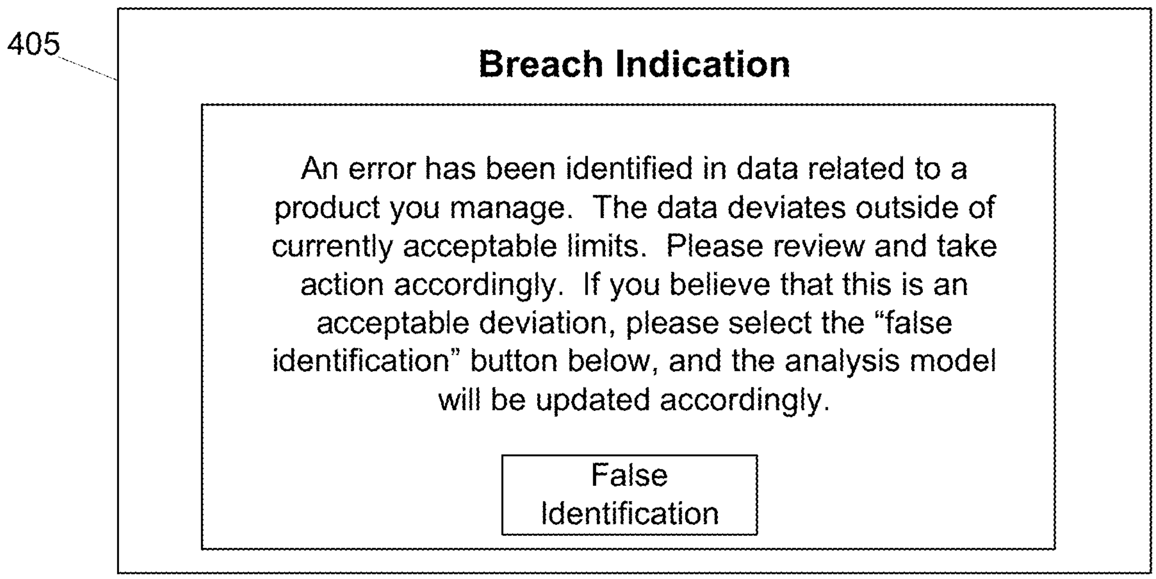
FIG. 4 depicts an illustrative graphical user interface associated with dynamic configuration of data control limits in accordance with one or more example embodiments.

Referring to FIG. 2D, at step 215, based on or in response to the one or more commands directing the enterprise user device 104 to display the breach message, the enterprise user device 104 may display the breach message. For example, the enterprise user device 104 may display a message similar to graphical user interface 405, which is illustrated in FIG. 4.

At step 216, the enterprise user device 104 may receive user feedback. In some instances, the enterprise user device 104 may receive user feedback indicating that the identified breach is acceptable. For example, the enterprise user device 104 may receive feedback indicating that although the real time data was flagged as a breach (e.g., for falling outside the acceptable data range defined by the actual control limits), it actually falls within an acceptable deviation tolerance. In this example, the feedback may indicate that the actual control limits and/or the control limit prediction model may be updated so as to increase tolerance (e.g., expand the actual control limits and/or factor this into future control limit predictions).

Alternatively, the enterprise user device 104 may receive user feedback indicating that the identified breach is more severe than indicated in the indication of the breach. For example, the enterprise user device 104 may receive user feedback indicating that, based on the identified breach, the actual control limits and/or the control limit prediction model should be updated so as to decrease tolerance (e.g., tighten the actual control limits and/or factor this into future control limit predictions).

As yet another alternative, the enterprise user device 104 may receive user feedback indicating that the identified breach is an outlier data point. For example, the enterprise user device 104 may receive user feedback indicating that, although a breach was detected, it is either an acceptable outlier data point and/or it is an unacceptable outlier data point, but that due to the outlier nature of the identified breach, the actual control limits need not be adjusted based on the identification. In some instances, however, the user feedback may indicate that the control limit prediction model should be updated so as to recognize or otherwise accommodate the identified breach as an outlier.

Additionally or alternatively, the user feedback might not be specific to the identified breach, but may be input to otherwise inform the control limit prediction model. For example, the user feedback may indicate a natural disaster, weather event, calendar event, and/or other event that should be factored into analysis by the control limit prediction model.

In some instances, step 216 may be optional. In instances where step 216 is performed, the event sequence may continue through step 219. Otherwise, if no feedback is received, the event sequence may end.

At step 217, the enterprise user device 104 may send a user feedback message that includes the user feedback received at step 216. For example, the enterprise user device 104 may send the user feedback message to the deviation detection platform 102 while the second wireless data connection is established.

At step 218, the deviation detection platform 102 may receive the user feedback message sent at step 217. For example, the deviation detection platform 102 may receive the user feedback message via the communication interface 113 and while the second wireless data connection is established.

At step 219, the deviation detection platform 102 may use the human in the loop component to feed the user feedback into the control limit prediction model. For example, the deviation detection platform 102 may use the user feedback to adjust the control limit prediction model so as to configure the control limit prediction model to determine updated predicted control limits (and thus update the actual control limits accordingly). In some instances, based on identifying, based on the user feedback, that the identified breach is acceptable (e.g., within an acceptable data range), the deviation detection platform 102 may update the control limit prediction model to produce predicted control limits with an increased acceptable data range (which may, e.g., then be used by the deviation detection platform 102 to update the actual control limits).

Alternatively, in some instances, the deviation detection platform 102 may update the control limit prediction model to produce predicted control limits with a decreased (e.g., tighter) acceptable data range (which may, e.g., then be used by the deviation detection platform 102 to update the actual control limits). More specifically, the deviation detection platform 102 may decrease an upper control limit (e.g., without decreasing the lower control limit) and/or increase a lower control limit (e.g., without increasing the upper control limit) to reduce the acceptable data range. For example, the deviation detection platform 102 may update the control limit prediction model in this way based on user feedback indicating that the identified breach is more severe than was indicated and/or otherwise identified by the control limit prediction model.

As yet another alternative, in some instances, the deviation detection platform 102 may update the control limit prediction model to incorporate feedback that the identified breach is an outlier. For example, the deviation detection platform 102 may update the control limit prediction model to flag the identified breach as an acceptable outlier data point going forward, and/or otherwise cause the control limit prediction model to recognize or otherwise accommodate the identified breach as an outlier. In some instances, the deviation detection platform 102 might not adjust the actual or predicted control limits based on the identification of the outlier data. Additionally or alternatively, the deviation detection platform 102 may update the control limit prediction model to account for a natural disaster, weather event, calendar event, and/or other event in future outputs.

In doing so, the deviation detection platform 102 may improve predictive capabilities of the control limit prediction model. For example, by continuously and dynamically updating the control limit prediction model, the deviation detection platform 102 may provide accurate control limits in real time, which may result in more accurate data monitoring, analysis, and/or breach identification (which may thus improve the overall functioning and/or security of products whose data is being analyzed). This may offer technical advantages (e.g., increased accuracy) over manually set control limits or a control limit prediction model that does not incorporate real time feedback.

Figure 3:
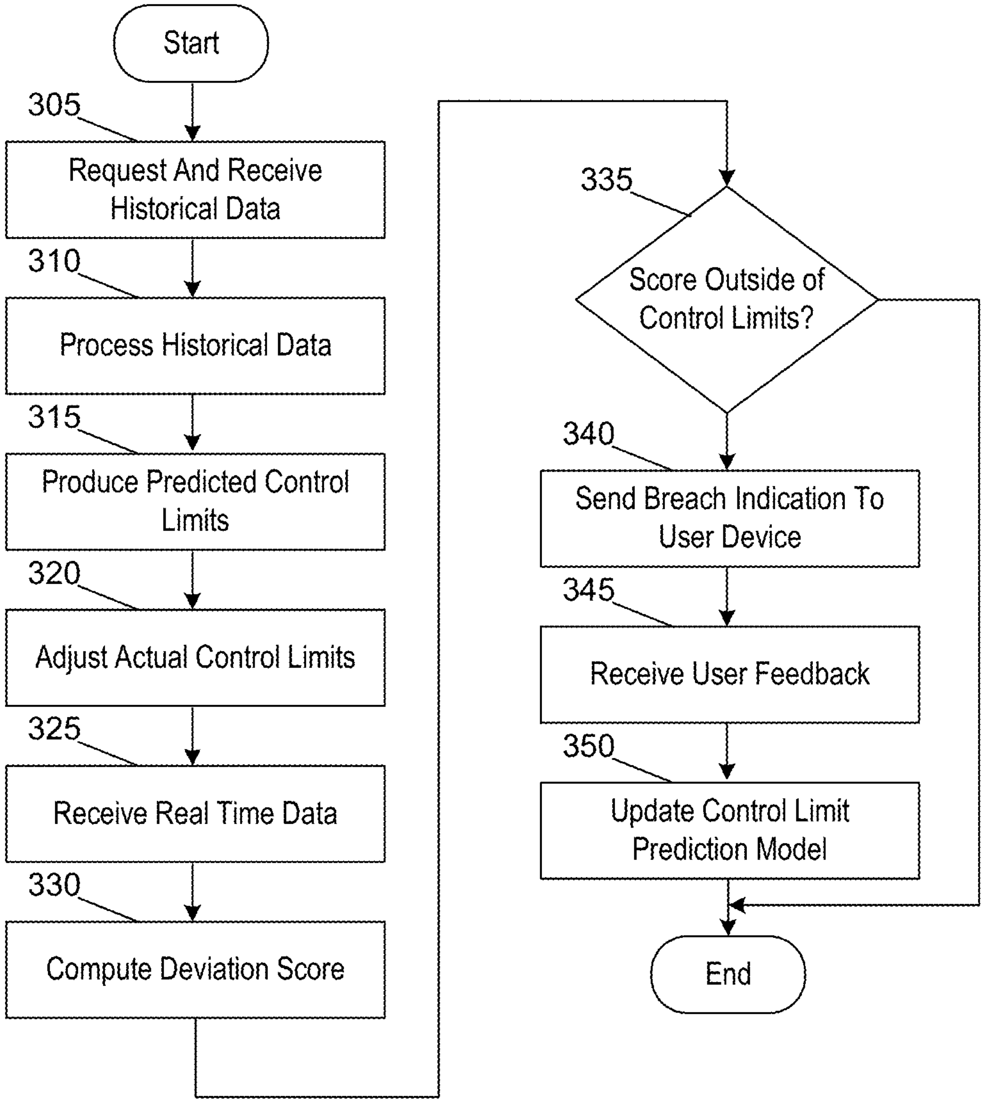
FIG. 3 depicts an illustrative method for performing dynamic configuration of data control limits in accordance with one or more example embodiments.

FIG. 3 depicts an illustrative method for dynamic configuration of data control limits in accordance with one or more example embodiments. Referring to FIG. 3, at step 305, a computing platform having at least one processor, a communication interface, and memory may request and receive historical data. At step 310, the computing platform may process the historical data to format it for a control limit prediction model. At step 315, the computing platform may produce predicted control limits by inputting the formatted data to the control limit prediction model. At step 320, the computing platform may adjust actual control limits based on the predicted control limits. At step 325, the computing platform may receive real time data. At step 330, the computing platform may compute a deviation score based on the real time data and the actual control limits. At step 335, the computing platform may compare the deviation score to the actual control limits to determine whether the actual control limits are exceeded. If the computing platform identifies that the deviation score is within the actual control limits, the method may end. If the computing platform identifies that the deviation score is not within the actual control limits, the computing platform may proceed to step 340.

At step 340, the computing platform may send a breach indication to an enterprise user device. At step 345, the computing platform may receive user feedback based on the breach indication. At step 350, the computing platform may update the control limits and/or the control limit prediction model based on the user feedback.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
- at least one processor;
- a communication interface communicatively coupled to the at least one processor; and
- memory storing computer-readable instructions that, when executed by the at least one processor, cause the computing platform to:
  - output, using two or more sub-models of a control limit prediction model and based on formatted historical data, model specific predicted control limits;
  - weight, using an ensemble model of the control limit prediction model, the outputs from the two or more sub-models to produce overall predicted control limits based on analysis performed by each of the two or more sub-models;
  - adjust existing control limits based on the overall predicted control limits to create actual control limits;
  - identify, using an upper control limit of the actual control limits, a lower control limit of the actual control limits, and real time data, a deviation score for the real time data; and
  - based on detecting that the deviation score breaches the actual control limits, send one or more commands directing an enterprise user device to display an indication of the breach, wherein sending the one or more commands directing the enterprise user device to display the indication of the breach causes the enterprise user device to display the indication of the breach.

2. The computing platform of claim 1, wherein the historical data comprises raw transaction data for a financial product, and wherein the historical data is not configured for processing by the control limit prediction model.

3. The computing platform of claim 1, wherein the memory stores additional computer-readable instructions that, when executed by the at least one processor, cause the computing platform to:
- receive historical data;
- format the historical data, for input into a control limit prediction model, to produce the formatted historical data; and
- input the formatted historical data into the control limit prediction model.

4. The computing platform of claim 3, wherein formatting the historical data for input into the control limit prediction model comprises one or more of:
- repairing missing values in the historical data,
- transforming categorical data of the historical data into numerical values, and
- scaling the historical data to a common scale.

5. The computing platform of claim 1, wherein the two or more sub-models comprise two or more of: an exponential smoothing model, a seasonal autoregressive integrated moving average model, a random forest model, a stochastic gradient descent model, a boosting model, and a human in the loop component.

6. The computing platform of claim 1, wherein the ensemble model comprises a stack lasso model.

7. The computing platform of claim 1, wherein identifying the deviation score for the real time data comprises applying the following formula: deviation score=((2*[value])−([lower control limit]+[upper control limit]))/([upper control limit]−[lower control limit]), wherein:
- the value comprises the real time data,
- the lower control limit comprises a lower bound of the actual control limits, and
- the upper control limit comprises an upper bound of the actual control limits.

8. The computing platform of claim 1, wherein the memory stores additional computer-readable instructions that, when executed by the at least one processor, cause the computing platform to:
- receive, from the enterprise user device, a feedback message including user feedback indicating one or more of:
  - the identified breach is acceptable,
  - the identified breach is more severe than indicated in the indication of the breach, and
  - the identified breach is an outlier data point; and update, based on the user feedback and through a human in the loop component of the control limit prediction model, the control limit prediction model.

9. The computing platform of claim 8, wherein updating the control limit prediction model comprises, based on identifying, based on the user feedback, that the identified breach is acceptable, increasing an acceptable range supported by the actual control limits.

10. The computing platform of claim 8, wherein updating the control limit prediction model comprises, based on identifying, based on the user feedback, that the identified breach is more severe than indicated in the indication of the breach, decreasing an acceptable range supported by the actual control limits.

11. The computing platform of claim 8, wherein updating the control limit prediction model comprises, based on identifying, based on the user feedback, that the identified breach is the outlier data point, flagging the identified breach as an outlier within the control limit prediction model without adjusting the actual control limits.

12. The computing platform of claim 1, wherein the memory stores additional computer-readable instructions that, when executed by the at least one processor, cause the computing platform to:

receive the real time data.

13. The computing platform of claim 1, wherein the memory stores additional computer-readable instructions that, when executed by the at least one processor, cause the computing platform to:

compare the deviation score to the actual control limits.

14. A method comprising:

at a computing platform comprising at least one processor, a communication interface, and memory:

outputting, using two or more sub-models of a control limit prediction model and based on formatted historical data, model specific predicted control limits;

weighting, using an ensemble model of the control limit prediction model, the outputs from the two or more sub-models to produce overall predicted control limits based on analysis performed by each of the two or more sub-models;

adjusting existing control limits based on the overall predicted control limits to create actual control limits;

identifying, using an upper control limit of the actual control limits, a lower control limit of the actual control limits and real time data, a deviation score for the real time data; and based on detecting that the deviation score breaches the actual control limits, sending one or more commands directing an enterprise user device to display an indication of the breach, wherein sending the one or more commands directing the enterprise user device to display the indication of the breach causes the enterprise user device to display the indication of the breach.

15. The method of claim 14, wherein the historical data comprises raw transaction data for a financial product, and wherein the historical data is not configured for processing by the control limit prediction model.

16. The method of claim 14, further comprising:

receiving historical data;

formatting the historical data, for input into a control limit prediction model, to produce the formatted historical data; and inputting the formatted historical data into the control limit prediction model.

17. The method of claim 16, wherein formatting the historical data for input into the control limit prediction model comprises one or more of:

repairing missing values in the historical data, transforming categorical data of the historical data into numerical values, and scaling the historical data to a common scale.

18. The method of claim 14, wherein the two or more sub-models comprise two or more of: an exponential smoothing model, a seasonal autoregressive integrated moving average model, a random forest model, a stochastic gradient descent model, a boosting model, and a human in the loop component.

19. The method of claim 14, wherein the ensemble model comprises a stack lasso model.

20. One or more non-transitory computer-readable media storing instructions that, when executed by a computing platform comprising at least one processor, a communication interface, and memory, cause the computing platform to:

output, using two or more sub-models of a control limit prediction model and based on formatted historical data, model specific predicted control limits;

weight, using an ensemble model of the control limit prediction model, the outputs from the two or more sub-models to produce overall predicted control limits based on analysis performed by each of the two or more sub-models;

adjust existing control limits based on the overall predicted control limits to create actual control limits;

identify, using an upper control limit of the actual control limits, a lower control limit of the actual control limits, and real time data, a deviation score for the real time data; and based on detecting that the deviation score breaches the actual control limits, send one or more commands directing an enterprise user device to display an indication of the breach, wherein sending the one or more commands directing the enterprise user device to display the indication of the breach causes the enterprise user device to display the indication of the breach.

* * * * *